United States Patent
Schoeffler et al.

(10) Patent No.: US 9,430,578 B2
(45) Date of Patent: Aug. 30, 2016

(54) SYSTEM AND METHOD FOR ANCHORING THIRD PARTY METADATA IN A DOCUMENT

(71) Applicant: Google Inc., Mountain View, CA (US)

(72) Inventors: Eric Benson Schoeffler, Boulder, CO (US); Ivan Young Lee, Boulder, CO (US); Nicholas Mark Vasic Cooper, Annandale (AU); Trevor Keir MacFergus Stone, Boulder, CO (US); Alain Vongsouvanh, Sunnyvale, CA (US); Ali Hamid Afshar, Santa Clara, CA (US); Victor Eric Fryzel, Sunnyvale, CA (US); Michael Jeffrey Procopio, Boulder, CO (US)

(73) Assignee: Google Inc., Mountain View, CA (US)

( * ) Notice: Subject to any disclaimer, the term of this patent is extended or adjusted under 35 U.S.C. 154(b) by 517 days.

(21) Appl. No.: 13/837,686

(22) Filed: Mar. 15, 2013

(65) Prior Publication Data

US 2014/0280384 A1    Sep. 18, 2014

(51) Int. Cl.
G06F 7/00    (2006.01)
G06F 17/30    (2006.01)

(52) U.S. Cl.
CPC ...... *G06F 17/3089* (2013.01); *G06F 17/30091* (2013.01); *G06F 17/30312* (2013.01)

(58) Field of Classification Search
CPC .................... G06F 17/30091; G06F 17/30312
USPC ......................................................... 707/812
See application file for complete search history.

(56) References Cited

U.S. PATENT DOCUMENTS

| | | |
|---|---|---|
| 7,263,688 B2 | 8/2007 | Pitzel et al. |
| 7,680,932 B2 | 3/2010 | Defaix et al. |
| 7,689,633 B1 | 3/2010 | Li et al. |
| 7,707,413 B2 | 4/2010 | Lunt et al. |
| 7,711,835 B2 | 5/2010 | Braddy et al. |
| 7,734,914 B1 | 6/2010 | Malasky |
| 7,779,113 B1 | 8/2010 | Samar |

(Continued)

FOREIGN PATENT DOCUMENTS

| | | |
|---|---|---|
| KR | 20100137323 | 12/2010 |
| KR | 20120010397 | 2/2012 |

(Continued)

OTHER PUBLICATIONS

PCT/US2014/029756 International Search Report dated Jul. 28, 2014.

(Continued)

*Primary Examiner* — Mark E Hershley
(74) *Attorney, Agent, or Firm* — Ropes & Gray LLP

(57) ABSTRACT

Systems and methods disclosed herein relate to a method of storing metadata for a file on a cloud based storage system. A server may receive a request from a third party application to store metadata for a file. The server may determine a metadata type based on the request. The server may associate the metadata value with an application identifier. The application identifier may identify a third party application. The server may store the metadata value based on the determined metadata type. The stored metadata may be associated with the application identifier and the stored metadata value may include information related to an anchor. The anchor may be an attribute of the file, and anchor can change respectively as the attribute changes.

20 Claims, 12 Drawing Sheets

(56) References Cited

U.S. PATENT DOCUMENTS

| | | |
|---|---|---|
| 7,827,201 B1 | 11/2010 | Gordon et al. |
| 7,917,888 B2 * | 3/2011 | Chong et al. ............... 717/102 |
| 7,941,419 B2 | 5/2011 | Bhatkar et al. |
| 7,996,380 B2 | 8/2011 | Arrouye et al. |
| 8,108,427 B2 | 1/2012 | Prahlad et al. |
| 8,131,723 B2 | 3/2012 | Sim-Tang |
| 8,151,323 B2 | 4/2012 | Harris et al. |
| 8,250,455 B2 | 8/2012 | Kadowaki et al. |
| 8,341,708 B1 | 12/2012 | Eatough et al. |
| 8,346,781 B1 | 1/2013 | Cornelius |
| 8,364,759 B2 | 1/2013 | Moromisato et al. |
| 8,386,478 B2 | 2/2013 | Wang |
| 8,468,455 B2 | 6/2013 | Jorgensen et al. |
| 8,478,817 B2 | 7/2013 | Duggal |
| 8,484,259 B1 | 7/2013 | Makkar et al. |
| 8,504,689 B2 | 8/2013 | Ferris et al. |
| 8,522,137 B1 | 8/2013 | Brown et al. |
| 8,572,033 B2 | 10/2013 | Shukla |
| 8,706,800 B1 | 4/2014 | Ahmed et al. |
| 8,812,627 B2 | 8/2014 | Donahue et al. |
| 8,856,176 B1 | 10/2014 | Venu et al. |
| 2003/0033369 A1 | 2/2003 | Bernhard |
| 2003/0126592 A1 | 7/2003 | Mishra et al. |
| 2004/0059776 A1 | 3/2004 | Pitzel et al. |
| 2004/0205358 A1 | 10/2004 | Erickson |
| 2004/0243827 A1 | 12/2004 | Aguilera et al. |
| 2005/0243760 A1 | 11/2005 | Yoshioka |
| 2005/0289538 A1 | 12/2005 | Black-Ziegelbein et al. |
| 2006/0005168 A1 | 1/2006 | Singh |
| 2006/0070029 A1 | 3/2006 | Laborczfalvi et al. |
| 2006/0074837 A1 | 4/2006 | Braddy et al. |
| 2007/0106984 A1 | 5/2007 | Birk Olsen et al. |
| 2007/0192739 A1 * | 8/2007 | Hunleth et al. ............... 715/823 |
| 2007/0240098 A1 | 10/2007 | Averett et al. |
| 2007/0254631 A1 | 11/2007 | Spooner |
| 2008/0033921 A1 * | 2/2008 | Arrouye et al. ............... 707/3 |
| 2008/0162493 A1 | 7/2008 | Blohm et al. |
| 2008/0172720 A1 | 7/2008 | Botz et al. |
| 2008/0184157 A1 | 7/2008 | Selig |
| 2008/0189361 A1 | 8/2008 | Greschler et al. |
| 2009/0083707 A1 | 3/2009 | Fujita et al. |
| 2009/0210721 A1 | 8/2009 | Phillips |
| 2009/0235352 A1 | 9/2009 | Schrijen et al. |
| 2009/0249185 A1 | 10/2009 | Datar et al. |
| 2009/0254572 A1 * | 10/2009 | Redlich et al. ............... 707/10 |
| 2009/0254580 A1 | 10/2009 | Laurion |
| 2009/0288135 A1 | 11/2009 | Chang et al. |
| 2010/0005529 A1 | 1/2010 | Hemade |
| 2010/0083173 A1 * | 4/2010 | Germann et al. ............... 715/810 |
| 2010/0088234 A1 | 4/2010 | Moore et al. |
| 2010/0161762 A1 | 6/2010 | Saxena |
| 2010/0257578 A1 | 10/2010 | Shukla et al. |
| 2010/0274910 A1 | 10/2010 | Ghanaie-Sichanie et al. |
| 2010/0281528 A1 | 11/2010 | Hayton et al. |
| 2010/0325086 A1 | 12/2010 | Skinner et al. |
| 2010/0325199 A1 | 12/2010 | Park et al. |
| 2011/0066668 A1 | 3/2011 | Guarraci |
| 2011/0093507 A1 | 4/2011 | Pilip |
| 2011/0137979 A1 | 6/2011 | Seo et al. |
| 2011/0154290 A1 | 6/2011 | Kelly |
| 2011/0184993 A1 | 7/2011 | Chawla et al. |
| 2011/0202672 A1 | 8/2011 | Narayanaswamy et al. |
| 2011/0209045 A1 | 8/2011 | Ghosh et al. |
| 2011/0231912 A1 | 9/2011 | Lee et al. |
| 2011/0247074 A1 | 10/2011 | Manring et al. |
| 2011/0252038 A1 | 10/2011 | Schmidt et al. |
| 2011/0252071 A1 | 10/2011 | Cidon |
| 2011/0258535 A1 | 10/2011 | Adler, III et al. |
| 2012/0005159 A1 | 1/2012 | Wang et al. |
| 2012/0095878 A1 | 4/2012 | Feldman et al. |
| 2012/0099135 A1 | 4/2012 | Ono |
| 2012/0110646 A1 | 5/2012 | Ajitomi et al. |
| 2012/0117626 A1 | 5/2012 | Yates et al. |
| 2012/0136865 A1 * | 5/2012 | Blom et al. ............... 707/739 |
| 2012/0144202 A1 | 6/2012 | Counterman |
| 2012/0144454 A1 | 6/2012 | Lee |
| 2012/0158668 A1 | 6/2012 | Tu et al. |
| 2012/0173612 A1 | 7/2012 | Vegesna-Venkata et al. |
| 2012/0179746 A1 | 7/2012 | Bolgert et al. |
| 2012/0192067 A1 | 7/2012 | DeLuca et al. |
| 2012/0254042 A1 | 10/2012 | Ludemann |
| 2012/0266229 A1 | 10/2012 | Simone et al. |
| 2013/0018904 A1 | 1/2013 | Mankala et al. |
| 2013/0036455 A1 | 2/2013 | Bodi et al. |
| 2013/0054356 A1 * | 2/2013 | Richman et al. ............ 705/14.49 |
| 2013/0086670 A1 | 4/2013 | Vangpat et al. |
| 2013/0111336 A1 | 5/2013 | Dorman et al. |
| 2013/0124606 A1 | 5/2013 | Carpenter et al. |
| 2013/0144934 A1 | 6/2013 | Swett et al. |
| 2013/0150163 A1 * | 6/2013 | Radek et al. ............... 463/35 |
| 2013/0282752 A1 * | 10/2013 | Day-Richter et al. ......... 707/769 |
| 2013/0282755 A1 * | 10/2013 | Procopio et al. ............. 707/770 |
| 2013/0304797 A1 | 11/2013 | Warren et al. |
| 2014/0074712 A1 * | 3/2014 | Palmer et al. ................... 705/44 |

FOREIGN PATENT DOCUMENTS

| | | |
|---|---|---|
| KR | 10-2012-0065072 | 6/2012 |
| KR | 10-2013-0007459 | 1/2013 |
| WO | WO 01/35211 A2 | 5/2001 |
| WO | WO 2010/054374 | 5/2010 |

OTHER PUBLICATIONS

Beresford et al., "MockDroid: Trading Privacy for Application Functionality on Smartphones," HotMobile '11, Mar. 1-3, 2011, Phoenix, AZ, USA, pp. 49-54.

Bibi et al., "A Platform for Delivering Multimedia Presentations on Cultural Heritage," 2010 14th Panhellenic Conference on Informatics, pp. 175-179.

Ellis et al., "Concurrency Control in Groupware Systems," ACM 1989, pp. 399-407.

Guo et al., "Building the PolarGrid Portal Using Web 2.0 and OpenSocial," SC '09, Nov. 14-20, 2009, Portland, Oregon, USA; 8 pages.

http://web.archive.org/web/20110629120453/https://developer.mozilla.org/en/Setting_up_extension_development_environment, Jun. 29, 2011, printed Jan. 9, 2015, 5 pages.

http://web.archive.org/web/20111006093926/https://addons.mozilla.org/en-US/firefox/extensions/?sort=featured, Oct. 6, 2011, printed Oct. 26, 2014, 9 pages.

http://web.archive.org/web/20111219132014/https://addons.mozilla.org/en-US/seamonkey, Dec. 19, 2011, printed Oct. 26, 2014, 5 pages.

http://web.archive.org/web/20120512130530/https://developer.mozilla.org/en/Setting_up_extension_development_environment, May 12, 2012, 7 pages.

http://web.archive.org/web/20120819143535/https://addons.mozilla.org/en-US/firefox/extensions/?sort=featured, Aug. 19, 2012, printed Dec. 13, 2013, 3 pages.

http://web.archive.org/web/20121020134710/https://addons.mozilla.org/en-US/seamonkey/extensions, Oct. 20, 2012, printed Dec. 13, 2013, 3 pages.

http://web.archive.org/web/20121021135356/http://support.mozilla.org/en-US/kb/find-and-install-add-ons-add-features-to-firefox, Oct. 21, 2012, printed Dec. 13, 2013, 3 pages.

http://web.archive.org/web20111226173518/http://en.wikipedia.org/wiki/Add-on_(Mozilla), Dec. 26, 2011, printed Oct. 26, 2014, 5 pages.

http://www-archive.mozilla.org/projects/webservices/, snapshot taken Apr. 21, 2008, printed Dec. 13, 2013, 4 pages.

https://addons.mozilla.org/en-US/firefox/addon/extension-manager-extended/, printed Oct. 26, 2014, 2 pages.

https://addons.mozilla.org/En-us/seamonkey/addon/gmail-smime/?src=search, printed Dec. 13, 2013, 2 pages.

International Search Report and Written Opinion dated Jul. 30, 2014 for Application No. PCT/US2014/032167—, 11 pages.

(56) References Cited

OTHER PUBLICATIONS

International Search Report and Written Opinion for PCT/US2013/037701 dated Jun. 26, 2013—, 10 pages.
International Search Report and Written Opinion for PCT/US2013/037773 dated Aug. 21, 2013—, 13 pages.
International Search Report and Written Opinion for PCT/US2013/047877 dated Oct. 31, 2013—, 9 pages.
Mayer et al., "Third-Party Web Tracking: Policy and Technology," Proceedings of the 2012 IEEE Symposium on Security and Privacy, pp. 413-427, May 20-23, 2012.
Nauman et al., "Apex: Extending Android Permission Model and Enforcement with User-Defined Runtime Constraints," ASIACCS '10, Apr. 13-16, 2010, Beijing, China, pp. 328-332.
Nichols et al., "High-Latency, Low-Bandwidth Windowing in the Jupiter Collaboration System," UIST '95. 8th Annual Symposium on User Interface Software and Technology. Proceedings of the ACM Symposium on User Interface Software and Technology, Nov. 14-17, 1995, pp. 111-120.
The Oauth 2.0 Authorization Protocol; draft ietf-oauth-v2-24; Mar. 8, 2012, 44 pages.
Zhou et al., "Taming Information-Stealing Smartphone Applications (on Android)," TRUST 2011, LNCS 6740, pp. 93-107, 2011.
Zissis et al., "Addressing Cloud Computing Security Issues," Future Generation Computer Systems 28 (2012) 583-592.
Office Action dated Apr. 11, 2016 in U.S. Appl. No. 14/229,712, (12 pages).

* cited by examiner

200

My Novel

It was the best of times,
it was the age of wisdom,
it was the epoch of belief,
it was the season on Light,
it was the spring of hope.

Comment #1 by John
8:00 pm 12/21/2012
Hey! I think you
forgot a few lines.
Add a title too please!

My Novel

A Tale of Three Cities  302

It was the best of times,
it was the worst of times,
it was the age of wisdom,
it was the age of foolishness,  306
it was the epoch of belief,
it was the epoch of incredulity,
it was the season on Light,
it was the season of Darkness
it was the spring of hope,
it was the winter of despair.

Comment #1 by John
8:00 pm 12/21/2012
Hey! I think you
forgot a few lines.
Add a title too please!

```
FileInfo {
        type: image/*
        fileID: 5128
        fileLocation: /native/files/5128
        revision: 2
        transformation: <none>
}
```

1100

1104

```
Comment {
        App1.Comment1 {
                type: comment
                revision: 2
                date: 12/12/2012 9:00pm EST
                commentID: 12345
                fileID: 5128
                author: Mark
                content: "Nice Mustaches!"
                anchors: <App1.AnchorA, App2.AnchorB>
        }
}
```

1106

```
Anchors {
        App1.AnchorA {
                revision_no: 2
                type: rectangle
                x_axis_location: 30px
                y_axis_location: 20px
                width: 50px
                height: 50px
                }
        App1.AnchorB {
                revision_no: 2
                type: circle
                x_axis_location: 300px
                y_axis_location: 40px
                radius: 50px
                }
}
```

FIG. 11

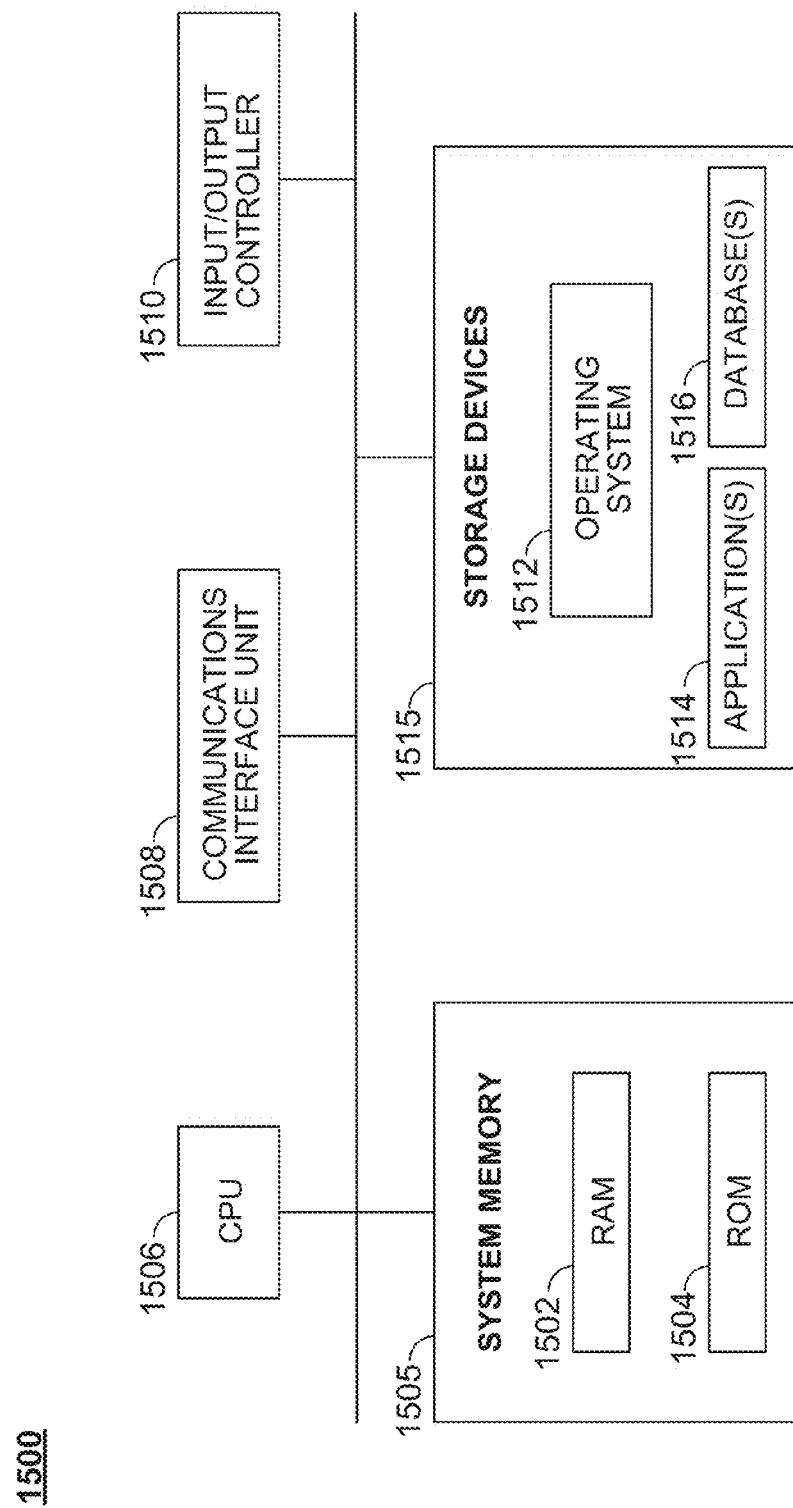

SYSTEM AND METHOD FOR ANCHORING THIRD PARTY METADATA IN A DOCUMENT

FIELD OF THE DISCLOSURE

This disclosure relates to systems and methods for third party anchoring of metadata in a document. More particularly, this disclosure relates to providing an interface for third party applications to interact with the metadata associated with files stored on a cloud based storage system.

BACKGROUND

Cloud based storage systems allow users to store files on a network based storage system. Some cloud based storage systems include cloud based applications for the users to access the files on the cloud based storage system using a web based client application. By using the cloud based application, a user may also be able to annotate parts of the file with metadata. For example, a user may wish to mark some text in the file as important by selecting a portion of the document and marking it using a comment feature. The corresponding metadata for the comment is often associated with a proprietary document model. Therefore, access to the metadata may be limited to cloud based applications or native applications designed with knowledge of the proprietary document model.

Sometimes native applications or cloud based applications may not be capable of accessing and modifying all types of file formats. In some cases, the user may need to process the file using an application that serves a very specific functional need. Therefore, there may be a need for accessing the files using third party applications. Third party applications may not understand the document model of cloud based storage files. Therefore, the user may lose information related to the file while trying to access the file using a third party application. To prevent third party applications from losing metadata information, there is a need for exposing the metadata related to content of the document.

SUMMARY

Accordingly, systems and methods disclosed herein provide third party applications with access to the metadata related to content of a file stored on a cloud based storage device.

Certain implementations relate to a method of storing metadata for a file on a cloud based storage system. A server may receive a request from a third party application to store metadata for a file. The server may determine a metadata type based on the request. The server may associate the metadata value with an application identifier. The application identifier may identify a third party application. The server may store the metadata value based on the determined metadata type. The stored metadata may be associated with the application identifier and the stored metadata value may include information related to an anchor.

Certain implementations relate to systems for storing metadata for a file on a cloud based storage system. The system may comprise a server that is configured to communicate over a network with a client system. The server may receive a request from a third party application to store metadata for a file. The server may determine a metadata type based on the request. The server may associate the metadata value with an application identifier. The application identifier may identify a third party application. The server may store the metadata value based on the determined metadata type. The stored metadata may be associated with the application identifier and the stored metadata value may include information related to an anchor.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which:

FIG. 2 is a diagram of an example of a display of a text file and corresponding metadata on a client system, according to an illustrative embodiment;

FIG. 3 is a diagram of an example of a display of a text file and corresponding metadata on a client system, according to an illustrative embodiment;

FIG. 11 is an example of a data structure of metadata stored in relation to a file on a cloud based storage system, according to an illustrative embodiment;

FIG. 15 is a block diagram of a computing device, such as any of the components of the system of FIG. 1, for performing any of the processes described herein, according to an illustrative embodiment.

DETAILED DESCRIPTION

Figure 1:
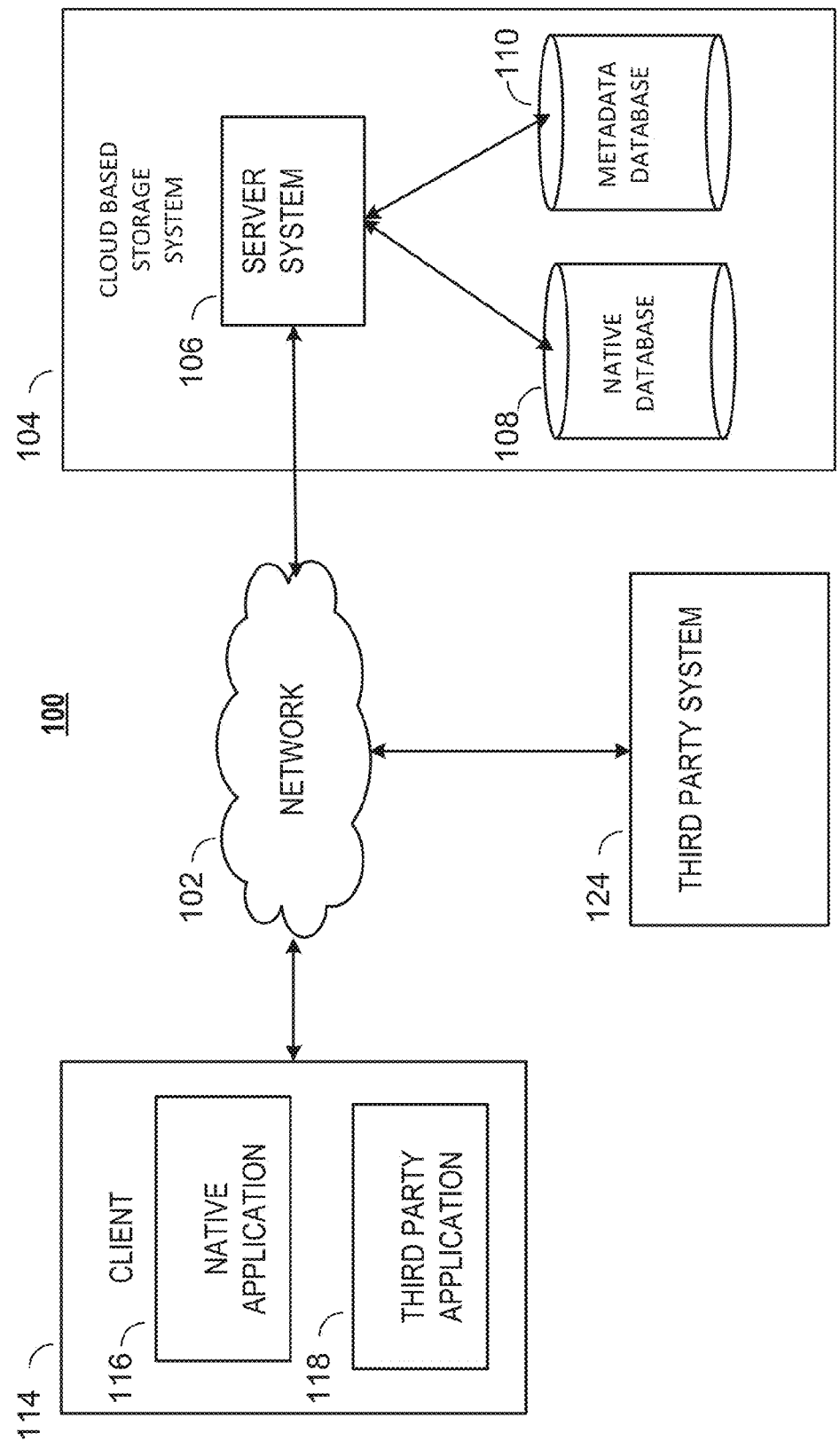
FIG. 1 is a block diagram of multiple systems communicating through a network in accordance with an implementation of the disclosure, according to an illustrative embodiment.

To provide an overall understanding of the systems and methods described herein, certain illustrative examples will now be described, including a system for storing metadata received from a third party application. However, it will be understood that the systems and methods described herein may be adapted and modified as is appropriate for the application being addressed and that the systems and methods described herein may be employed in other suitable applications, and that such other additions and modifications will not depart from the scope thereof.

The present disclosure provides systems and methods for exposing metadata associated with the content of files stored on a cloud based storage system. Interfaces between shared files in cloud based storage systems and third party applications are not well established. The systems and methods disclosed herein provide third party applications with an interface to access metadata related to files stored on a cloud based storage device. In particular, the present disclosure relates to providing, to a third party application, the ability to create and store metadata related to content of files stored on a cloud based storage system.

Data stored on a cloud based storage system may be received by a client system for processing, for example, using a locally installed application on the client system. For example, a text document may be downloaded to a client system and opened with a locally installed document processing application. A web based application that can be accessed online by a user rather than installed locally on a local client system, can also be used to process the text document. These online applications, which may have the same features and functionality as locally installed applications, are typically hosted on a remote server rather than a local client system, which allows the user to access the online applications from any device having internet access. Online applications may be capable of opening and processing data files stored on the cloud based storage system.

The present disclosure provides techniques for interfacing between third party applications, server systems that host online applications, and cloud based storage systems that store data files. In an example implementation, a client system may request, via a third party application, to open and process a data file stored on a cloud based storage system using an online application. The third party application may send a request to access a file to a server that interfaces with the cloud based storage system and the online applications. The request may include file information, which identifies a data file stored on the cloud based storage system, and also identification information of the user. The server may then process the request and provide to the client system the data file. The data file may include metadata associated with the content of the data file.

The metadata associated with the content of the data file may be anchored to one or more positions within the document. The data type for the anchor positions for the metadata may vary based on a file format of the data file. For example, when the data file is a photograph, the anchor position may be a pixel location of the metadata within the photograph. The client system may in turn provide the user with an interface to annotate the copy of the data file with metadata. The interface may be a browser interface, a mobile interface, an application graphical user interface, and/or other suitable interface for interacting with the copy of the data file. The user may use the interface to create metadata and anchor it to the content of the data file. The third party may transmit the metadata and the corresponding anchors to the server. The server may store the metadata received from the client and associate it with a respective document model of the file.

An exemplary system for implementing an interface between a client system, cloud based storage system and an online application system is shown in FIG. 1. FIG. 1 depicts an example of a network and network systems that may be used to implement the systems and methods described herein. FIG. 1 is a block diagram of a system 100 for a third party application 118 to access metadata related to content of files stored on a cloud based storage system 104. The system 100 includes a client system 114, a server system 106, a cloud based storage system 104, and/or a third party system 124. Each network system may include control circuitry configured to control the operation of the respective system. Processes and operations performed by each system may be implemented using the control circuitry. Only one cloud based storage system 104, one client system 114, one server 106, and one third party system 124 are shown in FIG. 1 to avoid complicating the drawing. In general, the system 100 can support multiple cloud based storage systems 104, client systems 114, servers 106, and third party systems 124.

The cloud based storage system 104 is a file hosting system that allows users to store and retrieve data accessible to one or more client systems such as the client system 114. This data may be referred to as a user file. As an example, the cloud based storage system 104 may store data on a single server system or in a distributed system. As used herein, the terms "user file" or "shared file" refer to data files stored on cloud based storage system 104, and may be used interchangeably. User files and shared files may be associated with a particular user. Shared files may also include files shared by other users. Examples of user files may be text documents, spreadsheets, multimedia files, and other types of binary data. Each user file may also have metadata associated with the user file. This metadata may be stored on the cloud based storage system 104 in a metadata database 110. The metadata may also be stored within the user file itself. Metadata includes information about the user file. Examples of metadata include filenames, dates and times that the file may have been accessed or processed, security information, generated previews of the file, and any other types of information related to the user file. In some implementations metadata may also be content related metadata. Examples of content related metadata may include comments by users on a selection of a file, tags identifying a user in an image file, tags identifying an author of a specific portion of a file, a thumbnail of the content of the file, and/or other suitable data related to the content of the file.

Server 106 may receive requests for user files from client systems 114 and from third party systems 124 over network 102. In response to the requests, the server 106 accesses user files stored on the cloud based storage system 104. The server 106 in FIG. 1 is shown as a part of the cloud based storage system 104. It is understood that server 106 may be implemented on a separate computing system from the cloud based storage system 104. The server 106 includes a processor which may be configured to perform the processes and operations of server 106. The requests from client systems 114 may include requests to access content related metadata of the user files. Server 106 may access the metadata database 110 to grant the client systems 114 requests. In some implementations, the request may be received from a native application 116 running on the client 114. The native application 116 may be an application that fully understands an internal data model of the user file. The server 106 may access the native database 108 in order to service the requests from the native application 116. The request may be sent via a third party application 118 running on the client system 114 and/or a third party system 124. The server 106 may access the metadata database 110 to service the request received via the third party application 118.

A client system 114 may send a request for accessing content related metadata to the server 106. The client system 114 may use a native application 116 to interface with the server. In some implementations, the native application 116 may be a web based browser application. The native application 116 may interface with the native database 108 via an online application executing on the server. The online application may have access to the data model of the user file and may service the client systems 114 request to access the content related metadata by accessing the native database 108. The native database 108 may store content related metadata by mapping them to identifiers in memory. An identifier may include alphanumeric characters, and/or other suitable ways to provide a unique identification for the content related metadata. A mapping of the identifier to the metadata may be stored in the native database 108.

In some implementations, the client system 114 may use a third party application 118 as an interface with the server. The third party application 118 may be a document processing application, an image processing application, a spreadsheet application, and/or any other suitable application for interfacing with the user file. The third party application 118 may request the server 106 to access content related metadata. The third party application 118 may not have knowledge of an internal data model. In an illustrative example, the request may be a request to store content related metadata and may include metadata and one or more associated anchor positions of the metadata. The server 106 may service the request from the third party application 118 using the metadata database 110. The server may associate content related metadata with one or more anchors for the metadata. The anchors may contain information related to the location of the content related to the metadata within the user file.

In certain implementations, a third party system 124 may send a request for accessing content related metadata to the server 106. The third party system 124 may be a server system for a third party cloud based application. For example, the third party system 124 could be a server for a web based service for aggregating media files for the user from cloud based storage systems used by the user. The server 106 of the cloud based storage system 104 may service the request from the third party system 124 using the metadata database 110.

FIG. 2 is a diagram of an example of a display 200 of a text file and corresponding metadata on a client system similar to the client system 114 of FIG. 1. It is to be understood that while FIG. 2 illustrates a user file as a text file 202, concepts discussed with respect to FIG. 2 may be applied to other user file formats. Some examples of other user file formats may include spreadsheets, presentations, videos, pdfs, images, and/or other suitable formats. It is understood that the other file formats may apply to other examples discussed in the disclosure and are not limited to the concepts discussed in FIG. 2. The display 200, as illustrated by FIG. 2, is an example of an interface of a third party application and/or a native application similar to the third party application 118 and/or the native application 116 of FIG. 1 respectively. A user may use an input device to select an anchor 206 within the text document 202. The user may associate a metadata with the anchor 206. In an example implementation, the metadata may include a comment 204. It is understood that while the metadata illustrated in FIG. 2 is a comment, concepts discussed herein apply to other types of metadata and may apply to other examples of the disclosure. Examples of other types of metadata may include the name of the author of a portion of the document, a username of a person included in a picture, and/or other suitable data related to the content of a document. The anchor 206 within the text document 202 may comprise information related to the position of the anchor 206 within the document. For example, the anchor 206 may comprise a byte offset of a word within the text document 202.

In some implementations, the location of the anchor 206 is adjusted with changes made to the text document. In the illustration of FIG. 2, the anchor 206 includes the selection of the word "light" and corresponding metadata is the comment 204. As the text document changes, the comment 204 location changes with a corresponding change in location of the word "light" within the text document. FIG. 3 will illustrate the movement of the anchor with respect to changes made to the document.

FIG. 3 is a diagram of an example of a display 300 of a text document 302 and corresponding metadata on a client system. The display 300 corresponds to the display 200 of FIG. 2. The text document 302 corresponds to the text document 202 of FIG. 2. An anchor 306 corresponds to the anchor 206 of FIG. 2. A comment 304 corresponds to the comment 204 of FIG. 2. The text document 302 is a modified version of the text document 202. The text document 302 has additional text in comparison to the text document 202. The movement of the anchor 206 to the anchor 306 illustrates that the location of the anchor 306 may change as changes are made to the text document 302. In some implementations, when a user adds data to the text document 302, the location of the anchor 306 within the document may also change. Accordingly, if data is added before the anchor 306, then a position of the anchor 306 is adjusted according to the modification. Likewise, if data is added after the anchor 306, the position of the anchor 306 remains unchanged.

Figure 4:
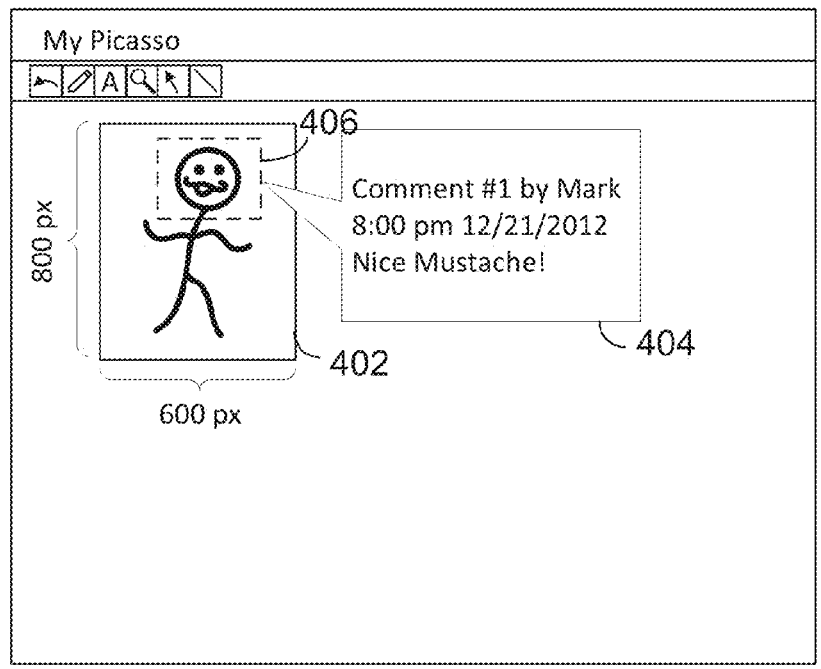
FIG. 4 is a diagram of an example of a display of an image file and corresponding metadata on a client system, according to an illustrative embodiment.

FIG. 4 is a diagram of an example of a display 400 of an image file 402 and corresponding metadata on a client system. The display 400, as illustrated by FIG. 4, is an example of an interface of a third party application and/or a native application similar to the third party application 118 and/or the native application 116 of FIG. 1 respectively. A user may use an input device to select an anchor 406 within the image file 402. The user may associate a metadata with the anchor 406. In an example, the metadata may include a comment 404. The anchor 406 within the image file 402 may comprise information related to the position of the anchor 406 within the image file 402. For example, an anchor 406 may include a rectangle with information identifying the pixel location of any one of the corners of the rectangle and/or the width and height of the rectangle. It is understood that while the anchor 406 illustrated by FIG. 4 is a rectangle, an anchor may be circular, triangular, and or other suitable forms for representing a portion of an image file. In some implementations, the location of the anchor 406 is adjusted with changes made to the image file 402. In the illustration in FIG. 4, the anchor 406 includes a rectangular selection of the image. The illustrated anchor 406 corresponds to the comment 404 which may have been associated with the anchor by a user of the image file 402. The location of the anchor 406 may adjust accordingly as changes are made to the image file 402.

Figure 5:
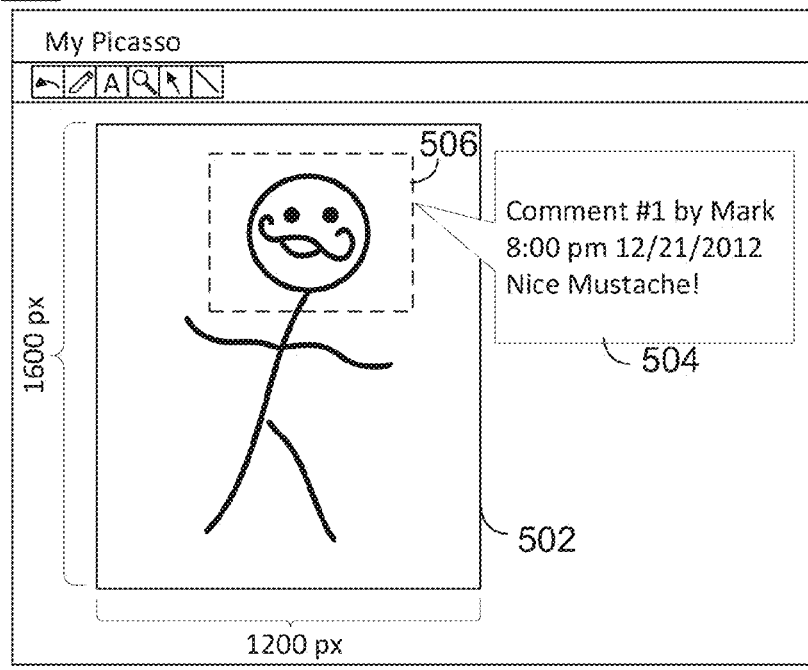
FIG. 5 is a diagram of an example of a display of an image file and corresponding metadata on a client system, according to an illustrative embodiment.

FIG. 5 is a diagram of an example of a display 500 of an image file 502 and corresponding metadata on a client system. The display 500 corresponds to the display 400 of FIG. 4. The image file 502 corresponds to the image file 402 of FIG. 4. Anchor 506 corresponds to the anchor 406 of FIG. 4. Comment 504 corresponds to the comment 404 of FIG. 4.

The image file 502, as illustrated herein, is a modified version of the image file 402. FIG. 4 illustrates that the image file 502 has been scaled up in comparison to the image file 402 of FIG. 4. Accordingly, the boundaries defining the rectangular anchor 506 are also scaled up to adjust for the changes made to the image file 502.

Figure 6:
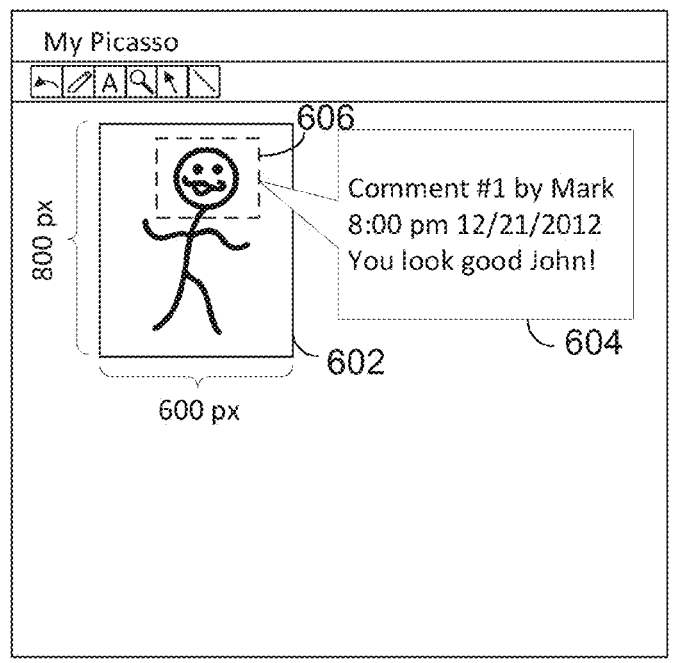
FIG. 6 is a diagram of an example of a display of an image file and corresponding metadata on a client system, according to an illustrative embodiment.
Figure 7:
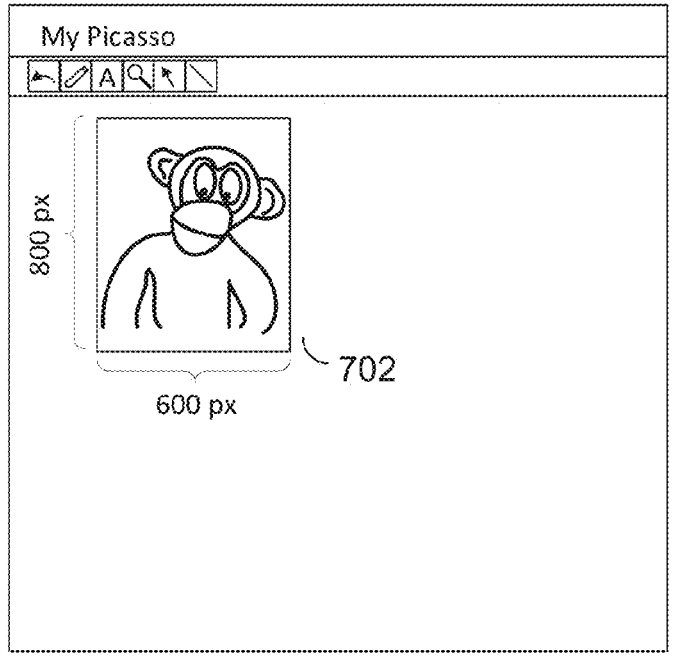
FIG. 7 is a diagram of an example of a display of an image file and corresponding metadata on a client system, according to an illustrative embodiment.

In some implementations, the metadata may include revision information of the image. The revision information may help in preventing stale metadata. Stale metadata may be, for example, anchored to a portion of a file that has been removed, deleted, and or replaced. FIGS. 6-7 illustrate a scenario in which an image file may include stale metadata.

FIG. 6 is a diagram of an example of a display 600 of an image file 602 and corresponding metadata on a client system. FIG. 7 is a diagram of an example of a display 700 of an image file 702 and corresponding metadata on a client system. The image file 702, in an illustrative example, is a modified version of the image file 602. In an illustrative example, the user selects a rectangle anchor 606 and adds a comment 604 metadata to the anchor 606. After adding the metadata to the file, the user may replace the image file 602 with a new image file 702. In some implementations, the comment 604 is associated with a revision number. The comment 604 may be displayed if the revision number of the content matches the revision number of the metadata. When the user replaces the image file 602, the revision number of the user file is updated. However, the revision number of the metadata remains the same. A server system similar to the server 106 of FIG. 1 may detect the mismatch between the metadata revision number and file revision number and prevents the third party application from displaying stale metadata.

Figure 8:
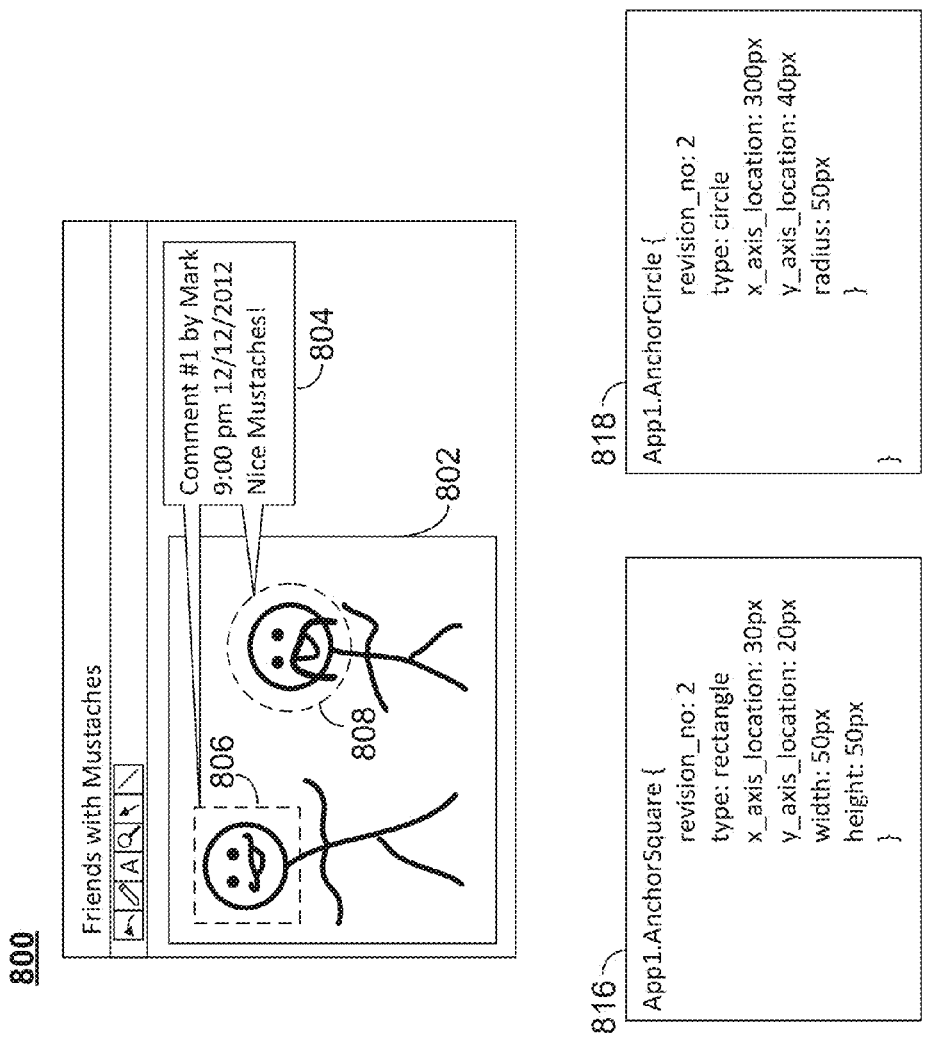
FIG. 8 is a diagram of an example of a display of an image file and a corresponding metadata associated with the image file on a client system, according to an illustrative embodiment.

FIG. 8 is a diagram of an example of a display 800 of an image file 802 and corresponding metadata on a client system. The image file, according to an illustrative example, includes two anchors 806 and 808. Metadata corresponding to the anchors is a comment 804 made by a user. A data structure named App1.AnchorSquare 816 corresponds to the square anchor 806. The data structure App1.AnchorSquare 816 is an example of a format for storing an anchor position in the metadata database of a cloud based storage system similar to the cloud based storage system 104 of FIG. 1. The App1.AnchorSquare data structure 816 may include attributes such as revision_no., type, x_axis_location, y_axis_location, width, height and/or other suitable data for storing information about the anchor's location. A user may add additional attributes to the data structure. The revision_no. attribute corresponds to a state of the user file at the time the metadata is created. The type attribute may correspond to a graphical element that a user may select in order to anchor the metadata. For example, the user may select a geometrical object within a file as an anchor. The selected geometrical object may define the type attribute of the anchor. For example, the selected geometrical object may be a rectangle, circle, triangle, and other suitable geometries. In an illustrative example, the user may select a frame of a video file corresponding to a point in time. The type attribute corresponding to the selected frame of the video may be defined by the selection of the point in time. The type of data structure corresponding to the point in time may be time based. The time data structure may include other attributes such as seconds, minutes, hours, and/or other suitable units of time. An App1.AnchorCircle data structure 818 corresponds to the circular anchor 808. The App1.AnchorCircle data structure 818 is an example of a format for storing anchor data corresponding to a circle in the metadata database. In some implementations, the circle data structure may store attributes related to the geometry of the circular anchor 808. Some examples of the attributes of the circular anchor 808 geometry include location of the center of the circle in x_axis_location and y_axis_location, radius of the circular geometry, and/or other suitable data related to defining an anchor within a document.

Figure 9:
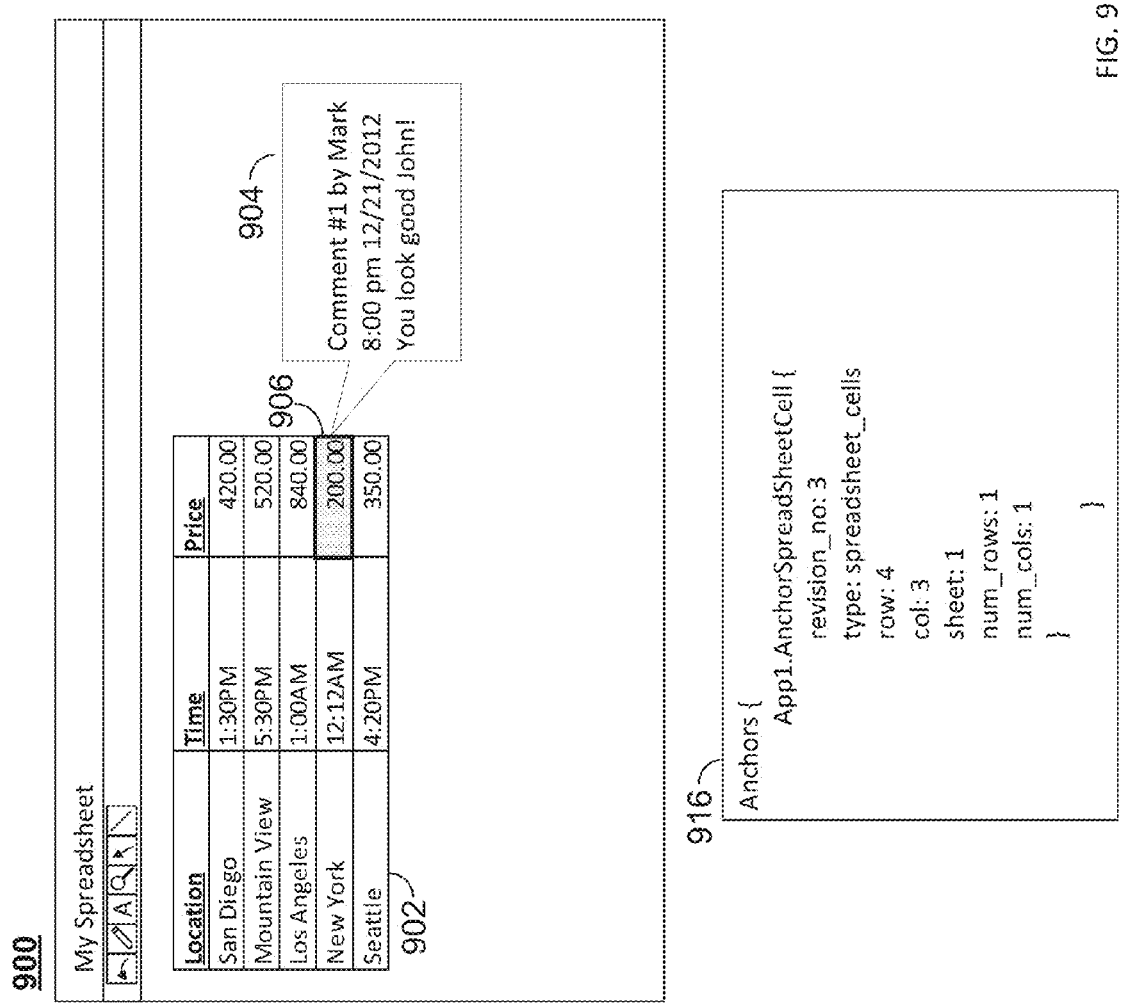
FIG. 9 is a diagram of an example of a display of a spreadsheet file and corresponding metadata associated with the spreadsheet file on a client system, according to an illustrative embodiment.

FIG. 9 is a diagram of an example of a display 900 of a spreadsheet file 902 and corresponding metadata associated on a client system. The spreadsheet file 902 includes a cell anchor 906. The metadata corresponding to the cell anchor 906 is a comment 904 made by a user Mark. A data structure App1.SpreadSheetCell 916 corresponds to the cell anchor 906. The data structure App1.SpreadSheetCell 916 is an example of a format for storing the cell anchor 906 in the metadata database of a cloud based storage system similar to the cloud based storage system 104 of FIG. 1. The data structure App1.SpreadSheetCell 916 may include attributes such as revision_no., type, row, col, sheet, num_rows, num_cols and/or other suitable data for storing information about the cell anchor's 906 location. A user may add additional attributes to the data structure App1.SpreadSheetCell 916. The revision_no. attribute corresponds to a state of the spreadsheet file 902 at the time the metadata is created. The type attribute may correspond to a location element within the spreadsheet file that a user may select in order to anchor the metadata. For example, the user may select an element of content making up the file. For example, in the illustrative example of FIG. 9, a user may select at least one cell of the spreadsheet file. The selected at least one cell of the spreadsheet file may be a spreadsheet_cells anchor type. It is understood that the type of anchor as spreadsheet_cells is an example of the type of an anchor and that the type of the anchor may refer to other suitable types for defining the type of content selected to anchor the metadata. In the example of a spreadsheet_cells type anchor, the row attribute may correspond to a row location of the selected spreadsheet cell within the file. The row location of a cell refers to the number of consecutive cells above the selected cell. The col location of a cell refers to the number of consecutive cells to the left of the selected cell. A spreadsheet file may have multiple sheets of data. The sheet attribute may correspond to an identifier of a sheet containing the anchor of the metadata. In an example, where the anchor corresponds to multiple cells in the spreadsheet, the num_rows and num_cols attributes may capture the width in number of cells and the height in number of cells, respectively, of the range of the multiple cells.

Figure 10:
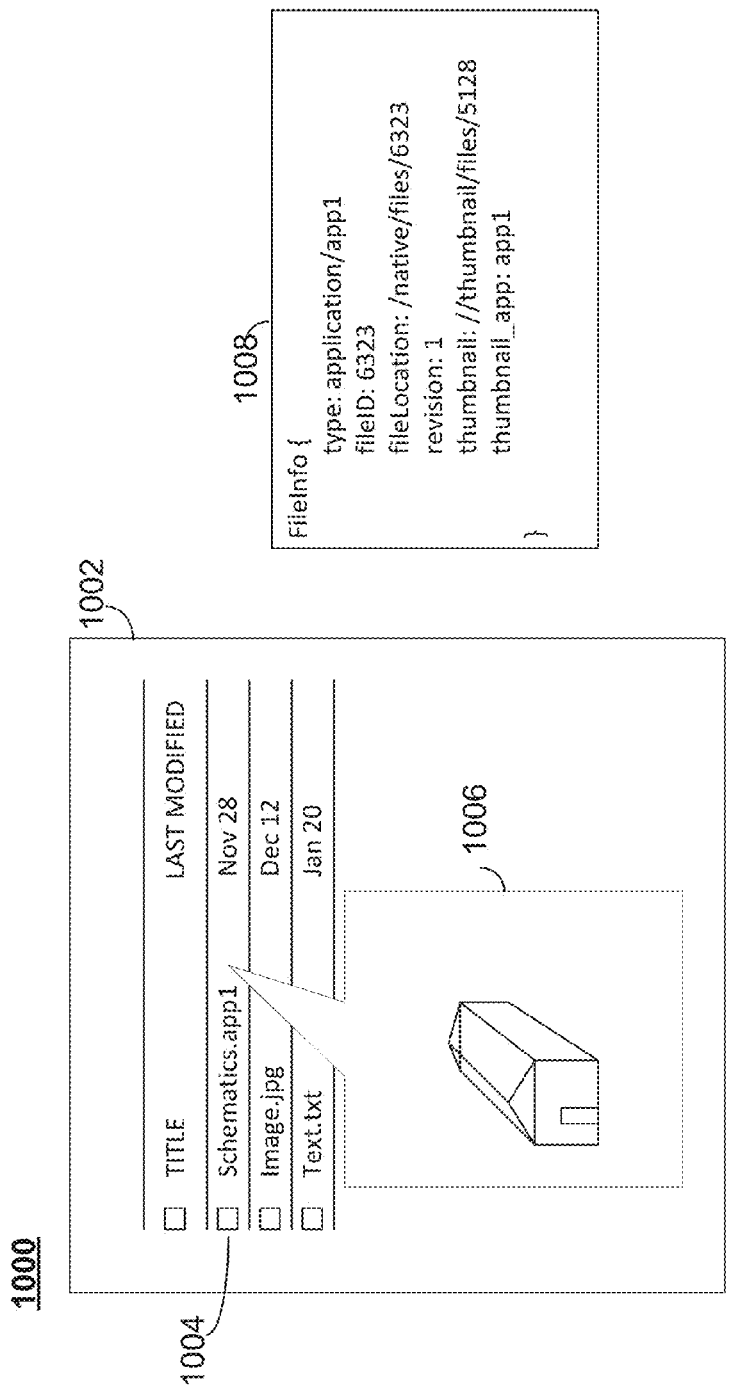
FIG. 10 is a diagram of an example of a display of a file browser for a cloud based storage application, according to an illustrative embodiment.

FIG. 10 is a diagram 1000 of an example of a display 1000 of a file browser 1002 for a cloud based storage application. The file browser 1002 may be a web based application for viewing files stored on a cloud based storage application similar to the cloud based storage system 104 of FIG. 1. A thumbnail 1006 may be associated with each file 1004 on the cloud based storage system. The thumbnail 1006 may be a compressed snapshot of the content of the file. As illustrated in display 1000, the thumbnail 1006 provides the user with a compressed view of the content of the file. The thumbnail 1006 may be included with the metadata for the file. The metadata corresponding to the thumbnail 1006 may be stored in a data structure 1008 on a metadata database. The data structure may include attributes such as type, file identifier, file location, revision, thumbnail, and thumbnail_app. A type attribute may include information about a third party application used to create the thumbnail 1006. The file identifier attribute may include information for identifying the corresponding file on the cloud based storage system. The file location attribute may include information for locating a parent folder of the file on the cloud based storage system. The revision number attribute may correspond to a version of the file at the time the thumbnail 1006 is created. The thumbnail attribute may include information for locating a parent folder of the thumbnail on the cloud based storage system. In some implementations, the thumbnail_app identifies a third party application used for creating the thumbnail associated with a cloud based storage file. It is understood that the data structure described herein in is for illustrative purposes. The data structure may be modified and adapted accordingly for supporting the systems and methods disclosed herein.

FIG. 11 is a diagram of an example of a data structure 1100 of metadata of a file on a cloud based storage system similar to the cloud based storage system 104 of FIG. 1. The metadata may be related to the entire content of the file. The metadata related to the entire content of the file may be stored in a FileInfo data structure 1102. The FileInfo data structure 1102 may include attributes relevant to the entirety of the file. For example, a type attribute may define the format of the file and the nature of the content of the file. For example, a file containing graphical data may have a corresponding image attribute type. Likewise, a file containing comma delimited text may be classified as a spreadsheet file type. It is understood that the FileInfo data structure 1102 may include attributes related to the file. Some examples of the file related attributes may include but are not limited to file identifier, file location, revision, transformation, thumbnail related information, comments related to the file and/or other suitable attributes relevant to the file.

In some implementations, metadata may be related to content of the file. In an example implementation, the cloud based storage system may store the metadata related to the content of the file in two parts. One part may include the content of the metadata. For example, a comment related to a selected portion of the file may have a corresponding data structure for storing the comment. Data structure 1100 illustrates an App1.comment data structure 1104 for storing the content of a comment. It is understood that while data structure 1104 illustrates a two part name separated by a "." between application identifier "App1" and metadata type "comment", the metadata may not be associated with any particular application. The comment metadata as illustrated in this case may be stored as a ".comment", "comment", and/or other suitable namespace format for storing an application agnostic metadata. The comment data structure may store attributes such as type, revision, date, comment identifier, file ID, author, content, anchors, and/or other suitable data for representing the comment. The anchors attribute of the comment data structure may link to an anchor data structure 1106 using an anchor naming convention.

It is possible that a first application may request the server for creating, modifying and/or reading a metadata type associated with a second application. The request from the first application may, in this case, include an application identifier associated with the second application. The server may retrieve metadata associated with the second application in order to service the request from the first application. In some implementations, the naming scheme of the metadata may be used for implementing access control for third party application metadata. For example, it may be possible to limit a first application App1 to only access metadata with "App1" and/or null as an application identifier. In certain cases, third party applications may choose to grant other third party applications rights to create, modify, and/or read their associated metadata values. It is understood that concepts discussed herein of the naming scheme for metadata may also apply to a naming scheme of anchors.

The second part of the data structure may include information about the location of content of the file to which the metadata may be related. In an example implementation, the anchor data structure 1106 may store a list of anchors in a file. In the illustrative data structure 1100, the anchor data structure includes a list of two anchors. In some implementations, individual anchors for a file may be identified by a two-part name form separated by a "." in the middle. For example the App1.AnchorA name has an "App1" part and an "AnchorA" part. The anchor naming scheme used in the anchor data structure 1106 may be used for identifying an anchor. The first part, App1, in the illustration of the anchor naming convention may correspond to an identifier of a third party application used to create the anchor. If the anchor is associated with a third party application identifier, the third party application may define rules for interpreting the anchor with respect to the content of the file. In some implementations, the anchor may not be related to a third party application, and the "App1" part may be null. For example, a native "AnchorA" may be stored as "AnchorA", ".AnchorA", and/or other suitable ways for storing application agnostic anchors. The second part may refer a type for identifying the anchor. The two part form for naming the anchor may reduce collisions between naming schemes for similar anchors used by a different third party application. The comment data structure 1104 may link to the anchor data structure 1106 using the two-part name of the anchor as an identifier.

Figure 12:
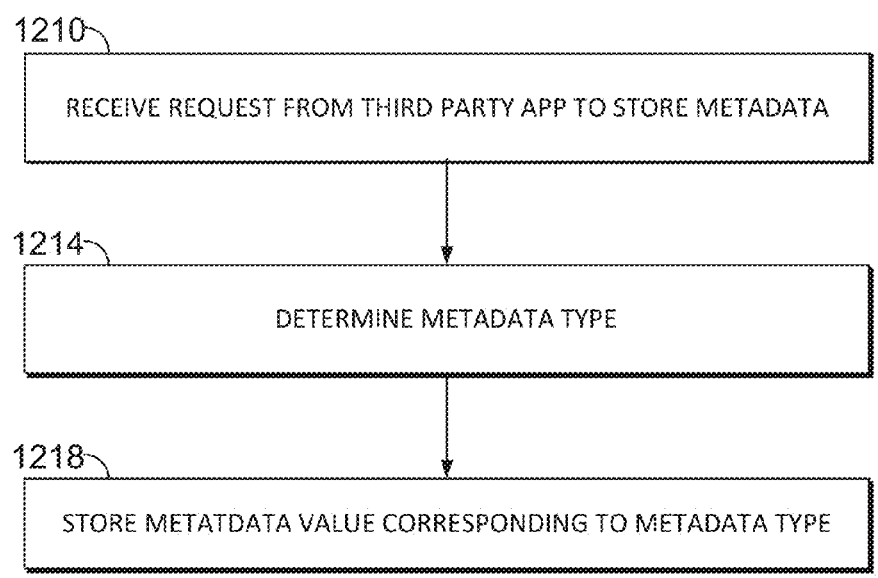
FIG. 12 is a flowchart of a method used by a computerized system for storing metadata received from a third party application, according to an illustrative embodiment.

FIG. 12 is a flowchart of a method 1200 used by a computerized system for storing metadata received from a third party application. At step 1210 of method 1200, a server system similar to the server system 106 of FIG. 1 may receive a request from a third party application to create metadata related to the content of a file stored on a cloud based storage system. The request may include, among other data, a file identifier for identifying the file, a link to a location of the file on the cloud based storage system, a revision number corresponding to a version of the file, a transformation matrix corresponding to a coordinate system of the third party application, an application identifier for identifying the third party application, a metadata type for identifying the nature of metadata to be created, a corresponding metadata value of the metadata, anchor positions related to the metadata and/or other suitable information related to creating metadata related to the file and/or content of the file. The metadata value may be similar to the metadata data structure 1104 of FIG. 11. The anchor positions may be similar to anchor positions in data structure 1106 of FIG. 11. The server may extract the information from the request to determine a metadata type.

At step 1214, the server may determine the metadata type received in the request. The server system may use the third party application identifier and/or the metadata type to determine a corresponding metadata type. In response to determining that metadata database does not have a corresponding metadata type, the server may create an entry for the new metadata type in the metadata database. The server may execute validation steps to determine whether data for storing the metadata in the metadata database is included in the request meets a certain standard. In response to determining that the data for storing the metadata is not included in the request, the server may transmit an error message to the third party application. In response to determining that the data for storing the metadata is not included in the request, the server may store metadata as file related metadata.

At step 1218, the server may store the metadata in the metadata database. The server may store the metadata values in a data structure similar to the comment data structure 1104 of FIG. 11 and the server may associate a metadata identifier with the stored metadata. The metadata may correspond to a comment. Accordingly, the server system may extract the metadata type and a metadata value from the request to create a comment data structure similar to the comment data structure 1104 of FIG. 11. The server system may extract anchor positions from the metadata value to identify any anchor positions contained in the metadata value. The extraction of the anchor positions may be achieved using a serialization scheme. In some implementations, the serialization scheme may be a publicly available serialization scheme such as JSON, a proprietary serialization scheme, and/or other suitable serialization scheme. The anchor positions may be stored on a metadata database in a data structure similar to the anchor data structure 1106.

Figure 13:
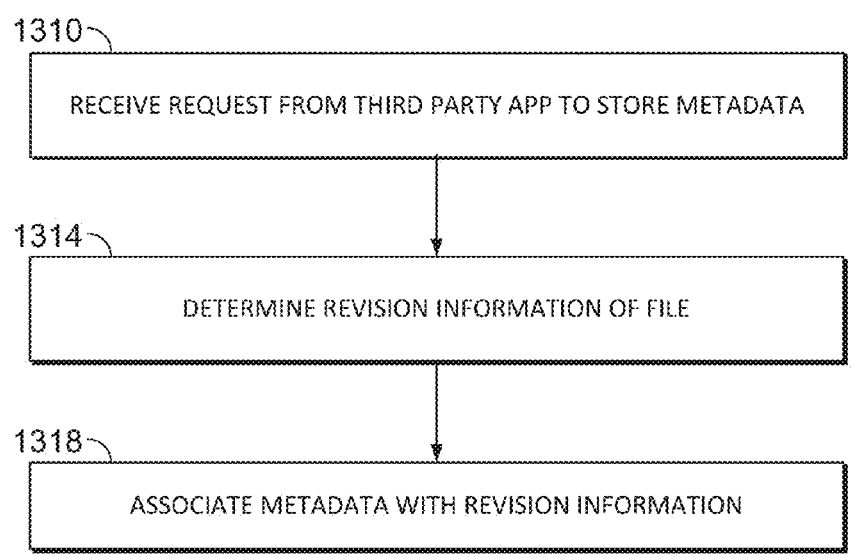
FIG. 13 is a flowchart of a method used by a computerized system for associating metadata received from a third party application with file revision information, according to an illustrative embodiment.

FIG. 13 is a flowchart of a method 1300 used by a computerized system for associating metadata received from a third party application with file revision information. At step 1310, the server system receives a request from a third party application to store metadata. Step 1310 may be similar to step 1210 of FIG. 12. At step 1314, the server system may extract revision information of the file from the request received in step 1310. In some implementations, the request may not include the revision information and/or the revision information may be null. The server system may determine from the request received in step 1310 that the revision information is not available.

At step 1318, in response to determining that the revision information is not available, the server may associate current revision information with the metadata information. The current revision information may correspond to a most recent state of the file on the cloud based storage system. In associating the current revision information with the metadata, the server may store the revision information in data structures similar to data structures 1104 and 1106 of FIG. 11.

Figure 14:
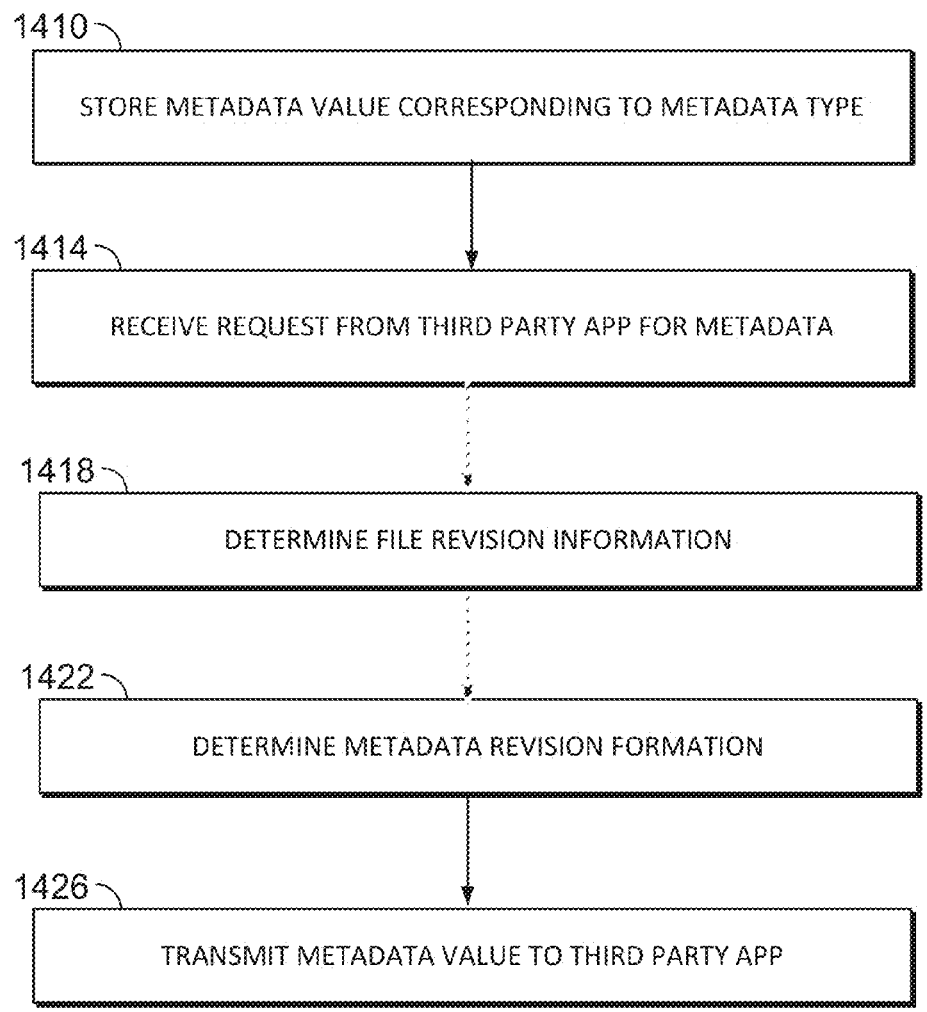
FIG. 14 is a flowchart of a method used by a computerized system for transmitting metadata to a third party application, according to an illustrative embodiment.

FIG. 14 is a flowchart of a method 1400 used by a computerized system for transmitting metadata to a third party application. At step 1410, the server may store metadata corresponding to a metadata type. Step 1410 may correspond to step 1318 of FIG. 13.

At step 1414, the server may receive a request from a third party application to read metadata related to a file and/or metadata related to content included in the file. The request may include information for identifying the metadata content of the file. For example, the request may include a file identifier for identifying the file, an application identifier for identifying a part of the metadata name, a metadata type for identifying the nature of the metadata requested, a metadata identifier for identifying a specific metadata and/or other suitable data for identifying the metadata requested by the third party application. In some implementations, the server may use the application identifier and the metadata type to find data structures similar to data structures 1104 and 1106 of FIG. 1. The metadata requested may also be metadata created by the native application in conjunction with the server, in which case, the server may use the metadata type to find relevant data structures. The server may retrieve metadata corresponding to the application identifier, the metadata type, and/or metadata identifier to service the request. In another example implementation, the server may retrieve metadata associated with file identifier to service the request.

The server may optionally implement steps 1418 and 1422. At step 1418, the server may determine file revision information. The server may access file related metadata data structure similar to data structure 1102 of FIG. 11 to access a revision number corresponding to a current state of the file.

At step 1422, the server may determine a metadata revision number. The server may access a metadata data structure similar to data structures 1104 and 1106 of FIG. 11. The server may access a revision number attribute of the metadata data structure to determine the metadata revision number. In some implementations the metadata revision number may include, among other information, the revision number attribute of the data structure. The server may compare the metadata revision number to the file revision information determined in step 1418. In response to determining that the metadata revision number is similar to the file revision number, the server may proceed with step 1426 of method 1400. In response to determining that the metadata revision number is different from the file revision number, the server may determine whether the content related to metadata may have changed since the creation of the metadata. In response to determining that the content related to the metadata may have changed, the server may not transmit the corresponding metadata to the third party application. In response to determining that the content related to the metadata is similar to content related to the metadata at the time of creation of the metadata, the server may proceed with step 1426 of method 1400.

At step 1426, the server may transmit the retrieved metadata and/or anchor positions associated with the metadata to the user.

FIG. 15 is a block diagram of a computing device, such as any of the components of the system of FIG. 1, for performing any of the processes described herein. Each of the components of these systems may be implemented on one or more computing devices 1500. In some aspects, a plurality of the components of these systems may be included within one computing device 1500. In some implementations, a component and a storage device may be implemented across several computing devices 1500.

The computing device 1500 comprises at least one communications interface unit 1508, an input/output controller 1510, system memory 1505, and one or more data storage devices 1515. The system memory includes at least one random access memory (RAM 1502) and at least one read-only memory (ROM 1504). All of these elements are in communication with a central processing unit (CPU 1506) to facilitate the operation of the computing device 1500. The computing device 1500 may be configured in many different ways. For example, the computing device 1500 may be a conventional standalone computer or alternatively, the functions of computing device 1500 may be distributed across multiple computer systems and architectures. In FIG. 15, the computing device 1500 can be linked, via network or local network, to other servers or systems.

The computing device 1500 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1508 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1506 comprises a processor, such as one or more conventional microprocessors and one or more supplementary co-processors such as math co-processors for offloading workload from the CPU 1506. The CPU 1506 is in communication with the communications interface unit 1508 and the input/output controller 1510, through which the CPU 1506 communicates with other devices such as other servers, user terminals, or devices. The communications interface unit 1508 and the input/output controller 1510 may include multiple communication channels for simultaneous communication with, for example, other processors, servers or client terminals.

The CPU 1506 is also in communication with the data storage device. The data storage device may comprise an appropriate combination of magnetic, optical or semiconductor memory, and may include, for example, RAM 1502, ROM 1504, and a flash drive, an optical disc such as a compact disc or a hard disk or drive. The CPU 1506 and the data storage device each may be, for example, located entirely within a single computer or other computing device; or connected to each other by a communication medium, such as a USB port, a serial port cable, a coaxial cable, an Ethernet cable, a telephone line, a radio frequency transceiver or other similar wireless or wired medium or combination of the foregoing. For example, the CPU 1506 may be connected to the data storage device via the communications interface unit 1508. The CPU 1506 may be configured to perform one or more particular processing functions.

The data storage device may store, for example, (i) an operating system 1512 for the computing device 1500; (ii) one or more applications 1514 (for example, computer program code or a computer program product) adapted to direct the CPU 1506 in accordance with the systems and methods described here, and particularly in accordance with the processes described in detail with regard to the CPU 1506; or (iii) database(s) 1516 adapted to store information that may be utilized to store information required by the program.

The operating system 1512 and applications 1514 may be stored, for example, in a compressed, an un-compiled and an encrypted format, and may include computer program code. The instructions of the program may be read into a main memory of the processor from a computer-readable medium other than the data storage device, such as from the ROM 1504 or from the RAM 1502. While execution of sequences of instructions in the program causes the CPU 1506 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to editing a sub-section of an electronic document via a notification message as described herein. The program also may include program elements such as an operating system 1512, a database management system and "device drivers" that allow the processor to interface with computer peripheral devices (for example, a video display, a keyboard, a computer mouse, etc.) via the input/output controller 1510.

The term "computer-readable medium" as used herein refers to any non-transitory medium that provides or participates in providing instructions to the processor of the computing device 1500 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1506 (or any other processor of a device described herein) for execution. For example, the instructions may initially be borne on a magnetic disk of a remote computer (not shown). The remote computer can load the instructions into its dynamic memory and send the instructions over an Ethernet connection, a cable line, or even a telephone line using a modem. A communications device local to a computing device 1500 (for example, a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method of storing metadata for a file on a cloud based storage system, the method comprising:

receiving, from a third party application, a request to store metadata for a file, the metadata having a metadata type and a metadata value, wherein the file has a proprietary document model that is specific to a native application and not the third party application;

determining the metadata type based on the request;

associating the metadata value with an application identifier, wherein the application identifier identifies the third party application; and storing, with the file on the cloud based storage system, the metadata type and metadata value in association with the application identifier, such that the third party application has access to the metadata type and the metadata value without having access to the proprietary document model, wherein the metadata value comprises information related to an anchor corresponding to a geometrically-defined location of a portion of content within the file when the portion of content within the file is graphically displayed to a user.

2. The method of claim 1, wherein the metadata value comprises information related to a plurality of anchors in the file, each anchor corresponding to a respective location of a respective portion of content within the file, and the metadata value being indicative of the respective locations of the respective portions.

3. The method of claim 1, wherein the anchor comprises a type and an attribute of the file, and wherein the anchor changes as the attribute changes based on the type.

4. The method of claim 3, wherein the attribute comprises one from the group of: a point of time in the file, a byte position in the file, a pixel location in the file, a page in the file, a cell in a grid in the file, and an index of an object in the file.

5. The method of claim 1, further comprising:
determining revision information for the file, wherein the revision information is based on a modified version of the file; and
associating the metadata value with the revision information for the file.

6. The method of claim 1, further comprising:
associating the metadata value with revision information by automatically storing the revision information corresponding to a revision of the file at a time when the metadata value is stored;
identifying a first revision number associated with the content of the file;
identifying a second revision number associated with the metadata;
comparing the first revision number to the second revision number;
providing a display of the content with an indication of the metadata when the first revision number matches the second revision number; and
providing a display of the content without an indication of the metadata when the first revision number does not match the second revision number.

7. The method of claim 1, further comprising:
receiving from the third party application a request for the metadata value for the file; and
transmitting to the third party application at least one metadata value based on the determined metadata type.

8. The method of claim 7, further comprising:
determining file revision information for the file based on the request for metadata for the file, wherein the file revision information is based on a modified version of the file;
determining metadata revision information, wherein the metadata revision information comprises file revision information associated with the metadata; and
transmitting to the third party application at least one metadata value based on the determined metadata type and the determined metadata revision information.

9. The method of claim 1, wherein the metadata value comprises information related to a thumbnail of the file that includes a compressed version of the content in the file, wherein the anchor corresponding to the metadata value is null, indicating that the anchor is not related to any third party application.

10. The method of claim 1, wherein the anchor is associated with the application identifier.

11. A system for storing metadata for a file on a cloud based storage system, the system comprising a processor configured to:
receive from a third party application a request to store metadata for a file, the metadata having a metadata type and a metadata value, wherein the file has a proprietary document model that is specific to a native application and not the third party application;
determine the metadata type based on the request;
associate the metadata value with an application identifier, wherein the application identifier identifies the third party application; and
store, with the file on the cloud based storage system, the metadata type and metadata value in association with the application identifier, such that the third party application has access to the metadata type and the metadata value without having access to the proprietary document model, wherein the metadata value comprises information related to an anchor corresponding to a geometrically-defined location of a portion of content within the file when the portion of content within the file is graphically displayed to a user.

12. The system of claim 11, wherein the metadata value comprises information related to a plurality of anchors in the file, each anchor corresponding to a respective location of a respective portion of content within the file, and the metadata value being indicative of the respective locations of the respective portions.

13. The system of claim 11, wherein the anchor comprises a type and an attribute of the file, and wherein the anchor changes as the attribute changes based on the type.

14. The system of claim 13, wherein the attribute comprises one from the group of: a point of time in the file, a byte position in the file, a pixel location in the file, a page in the file, a cell in a grid in the file, and an index of an object in the file.

15. The system of claim 11, wherein the processor circuitry is further configured to:
determine revision information for the file, wherein the revision information is based on a modified version of the file; and
associate the metadata value with the revision information for the file.

16. The system of claim 11, wherein the processor circuitry is further configured to:
associate the metadata value with revision information by automatically storing the revision information corresponding to a revision of the file at a time when the metadata is stored;
identify a first revision number associated with the content of the file;
identify a second revision number associated with the metadata;
compare the first revision number to the second revision number;
provide a display of the content with an indication of the metadata when the first revision number matches the second revision number; and
provide a display of the content without an indication of the metadata when the first revision number does not match the second revision number.

17. The system of claim 11, wherein the processor circuitry is further configured to:
   receive from the third party application a request for the metadata for the file; and
   transmit to the third party application at least one metadata value based on the determined metadata type.

18. The system of claim 17, wherein the processor is further configured to:
   determine file revision information for the file based on the request for metadata for the file, wherein the file revision information is based on a modified version of the file;
   determine metadata revision information, wherein the metadata revision information comprises file revision information associated with the metadata value; and
   transmit to the third party application at least one metadata value based on the determined metadata type and the determined metadata revision information.

19. The system of claim 11, wherein the metadata comprises information related to a thumbnail of the file that includes a compressed version of the content in the file, and wherein the anchor corresponding to the metadata value is null, indicating that the anchor is not related to any third party application.

20. The system of claim 11, wherein the anchor is associated with the application identifier.

* * * * *